US012524014B2

(12) United States Patent
Shi

(10) Patent No.: US 12,524,014 B2
(45) Date of Patent: Jan. 13, 2026

(54) MOTION CONTROL METHOD AND APPARATUS, ROBOT AND READABLE STORAGE MEDIUM

(71) Applicant: Beijing Xiaomi Robot Technology Co., Ltd., Beijing (CN)

(72) Inventor: Xuanyang Shi, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 505 days.

(21) Appl. No.: 18/188,210

(22) Filed: Mar. 22, 2023

(65) Prior Publication Data
US 2024/0168486 A1    May 23, 2024

(30) Foreign Application Priority Data
Nov. 23, 2022   (CN) .......................... 202211478696.X

(51) Int. Cl.
G05D 1/00   (2024.01)
B62D 57/032   (2006.01)
(52) U.S. Cl.
CPC .......... *G05D 1/0268* (2013.01); *B62D 57/032* (2013.01)
(58) Field of Classification Search
CPC ................ G05D 1/0268; B62D 57/032; G05B 2219/45083
See application file for complete search history.

(56) References Cited

U.S. PATENT DOCUMENTS

2005/0038560 A1\* 2/2005 Nagasaka ............ B62D 57/032
                                                                    700/245
2006/0149420 A1\* 7/2006 Ikeuchi ................ B62D 57/032
                                                                    700/245
(Continued)

FOREIGN PATENT DOCUMENTS

CN     102323818 A    1/2012
CN     104331081 A    2/2015
(Continued)

OTHER PUBLICATIONS

Kajita, S., et al., "Study of Dynamic Biped Locomotion on Rugged Terrain-Derivation and Application of the Linear Inverted Pendulum Mode," IEEE International Conference on Robotics and Automation, Sacramento, CA, USA (1991).

(Continued)

*Primary Examiner* — Harry Y Oh
(74) *Attorney, Agent, or Firm* — Volpe Koenig

(57) ABSTRACT

A motion control method includes: acquiring a current state parameter of a robot in response to determining that the robot is in a single-foot supporting state; and determining, based on a first preset function and a preset angular momentum value, the position of the centroid of the robot relative to a swing foot at an end moment of the current single-foot supporting state according to the current state parameter of the robot, such that an angular momentum of the centroid relative to the support foot at an end moment of a next single-foot supporting state reaches the angular momentum value, and controlling the robot to walk according to the position of the centroid of the robot relative to the swing foot at the end moment of the current single-foot supporting state.

20 Claims, 10 Drawing Sheets

(56) References Cited

U.S. PATENT DOCUMENTS

| | | | | |
|---|---|---|---|---|
| 2007/0156283 A1* | 7/2007 | Takenaka | ............ | B62D 57/032 |
| | | | | 700/245 |
| 2007/0185618 A1* | 8/2007 | Nagasaka | ............ | B62D 57/032 |
| | | | | 700/245 |
| 2009/0171503 A1* | 7/2009 | Takenaka | ............ | B62D 57/032 |
| | | | | 700/250 |
| 2011/0160906 A1* | 6/2011 | Orita | .................... | B62D 57/032 |
| | | | | 901/1 |
| 2011/0160907 A1* | 6/2011 | Orita | ..................... | B25J 9/1607 |
| | | | | 700/260 |
| 2016/0016308 A1* | 1/2016 | Kanazawa | ............ | B25J 9/1607 |
| | | | | 700/263 |
| 2018/0001471 A1* | 1/2018 | Kanazawa | ........... | B62D 57/032 |
| 2021/0237265 A1* | 8/2021 | Zhu | ........................ | B25J 9/1602 |

FOREIGN PATENT DOCUMENTS

| | | | |
|---|---|---|---|
| CN | 113359800 A | | 9/2021 |
| JP | 2009195999 A | * | 9/2009 |

OTHER PUBLICATIONS

Gong, Y., et al., "Zero Dynamics, Pendulum Models, and Angular Momentum in Feedback Control of Bipedal Locomotion," ArXiv (2021).

Extended European Search Report issued on Sep. 19, 2023 for European Patent Application No. 23164343.8.

* cited by examiner

MOTION CONTROL METHOD AND APPARATUS, ROBOT AND READABLE STORAGE MEDIUM

CROSS REFERENCE TO RELATED APPLICATIONS

The disclosure is provided based on and claims the priority to the Chinese Patent Application No. 202211478696.X, filed on Nov. 23, 2022, the entire contents of which are incorporated herein by reference.

BACKGROUND

With the progress of a robot technology, biped robots that can maintain a flexible walking ability on slopes and other uneven terrains have gradually drawn the attention of the industry. However, most of control methods of the biped robots at this stage assume that a robot is walking on a plane, and a slope is used as a disturbance factor for control, resulting in a poor planning ability of the robot walking on the slope and an unstable walking effect.

SUMMARY

According to a first aspect of an example of the disclosure, a motion control method is provided and performed by a biped robot, and the method includes:
  acquiring a state parameter of the robot at a current moment in response to determining that the robot is in a single-foot supporting state, where the state parameter includes an angular momentum of a centroid of the robot relative to a support foot and a position of the centroid relative to the support foot;
  determining, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and
  controlling the robot to walk according to the position of the centroid of the robot relative to the swing foot at the end moment of the current single-foot supporting state.

According to a second aspect of an example of the disclosure, a robot is provided, including:
  a memory, configured to store processor executable instructions; and
  a processor, configured to execute the executable instructions stored in the memory to implement steps of the method described in any implementation of the first aspect.

According a third aspect of an example of the disclosure, a non-transitory computer readable storage medium is provided, storing a computer program, and the program, when executed by a processor, implements steps of the method described in any implementation of the first aspect.

It needs to be understood that the above general descriptions and later detailed descriptions are merely explanatory and illustrative, and cannot limit the disclosure.

BRIEF DESCRIPTION OF THE DRAWINGS

Accompanying drawings here are incorporated into the specification and constitute a part of the specification, showing examples consistent with the disclosure, and are used together with the specification to explain the principle of the disclosure.

DETAILED DESCRIPTION

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

The terms used in the disclosure are merely for the purpose of describing specific examples, and not intended to limit the disclosure. The singular forms "one", "said" and "the" used in the disclosure and the appended claims are also intended to include plural forms unless the context clearly indicates other meanings. It needs also to be understood that the term "and/or" as used here refers to and includes any or all possible combinations of one or more associated listed items.

It needs to be understood that although the terms first, second, third, etc. may be used to describe various information in the disclosure, such information should not be limited to these terms. These terms are merely used to distinguish the same type of information from each other. For example, without departing from the scope of the disclosure, first information may also be referred to as second information, and similarly, the second information may also be referred to as the first information. Depending on the context, the word "if" as used here can be interpreted as "at the time" or "when" or "in response to determining".

The disclosure relates to the technical field of robots, in particular to a motion control method and apparatus, a robot and a readable storage medium.

With the progress of a robot technology, biped robots that can maintain a flexible walking ability on slopes and other uneven terrains have gradually drawn the attention of the industry. However, most of control methods of the biped robots at this stage assume that a robot is walking on a plane, and a slope is used as a disturbance factor for control, it is impossible to correct an angular momentum value of the robot during each step of the robot, which is prone to causing a large deviation between an actual motion posture of the robot and a preset posture, resulting in a poor planning ability of the robot walking on the slope and an unstable walking effect.

Figure 1:
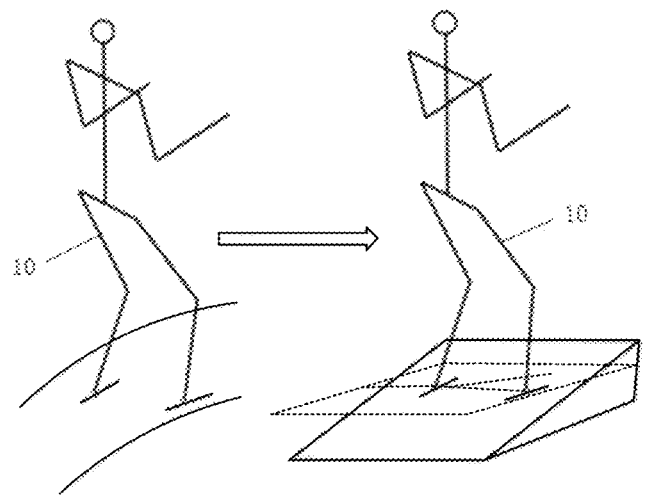
FIG. 1 is a schematic diagram of a biped robot 10 illustrated according to an example of the disclosure.

At present, compared with wheeled and tracked robots, a biped robot shown in FIG. 1 has more superiorities in a motion ability in an uneven environment. At the present stage, most of motion control methods of the biped robot assume that the robot is walking on a plane, and a slope is used as a disturbance factor for control, or an inclination of a walking region is acquired in advance, and a position of a centroid of the robot at each moment is judged with a fixed trajectory to adjust a motion posture of the robot. However, the method cannot correct an angular momentum value of the robot during each step of the robot, which is prone to causing a large deviation between an actual motion posture of the robot and a preset motion posture, and it is difficult to realize omni-directional stable walking on the slope and other complex terrain.

In view of this, the disclosure provides a motion control method performed by a biped robot, so as to at least solve problems existing in the related art.

Figure 2:
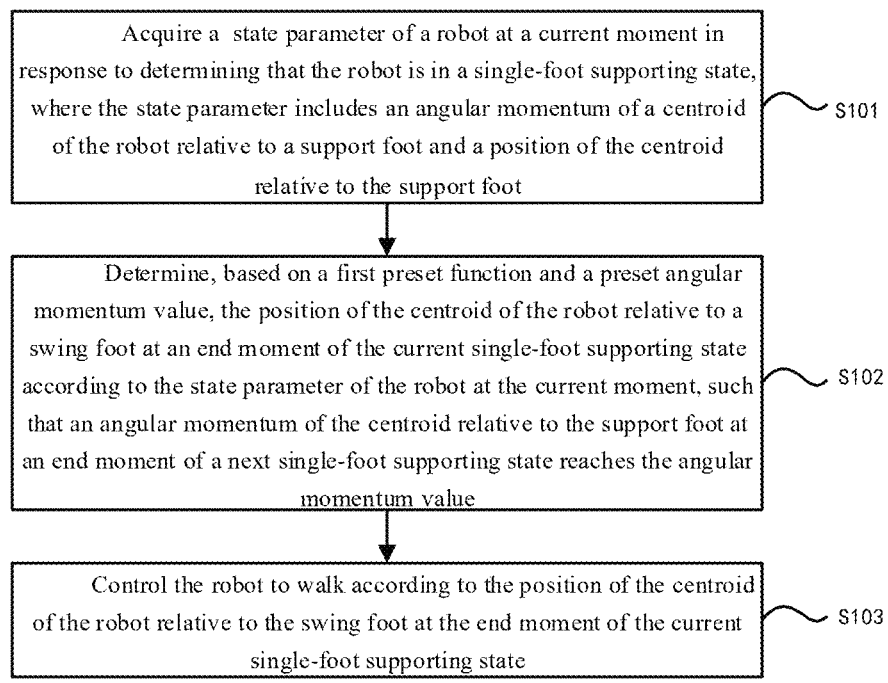
FIG. 2 is a flow chart of a motion control method illustrated according to an example of the disclosure.

FIG. 2 illustrates a flow chart of a motion control method illustrated according to an example of the disclosure.

In step S101, a state parameter of the robot at the current moment is acquired in response to determining that the robot is in a single-foot supporting state, where the state parameter includes an angular momentum of a centroid of the robot relative to a support foot and a position of the centroid relative to the support foot.

A walking process of the robot may be divided into a single-foot supporting state and a support foot exchange state. The single-foot supporting state represents that the robot uses one foot as a support foot to support a robot main body, and meanwhile uses the other foot as a swing foot to maintain a certain distance from the ground, and move the robot towards a corresponding direction by a swing action. An end moment of the single-foot supporting state represents that the swing foot is about to be in contact with the ground, and the support foot is about to execute the swing action as the next swing foot. At a completion moment of the support foot exchange state, identities of the swing foot and the support foot of the robot are exchanged, the original swing foot that has been in contact with the ground will support the robot main body as the support foot in the next single-foot supporting state, and the original support foot will be separated from the ground and execute the swing action as the swing foot in the next single-foot supporting state.

In an instance, whether the robot is in the single-foot supporting state at the current moment may be determined according to a preset walking time. For instance, a walking time of each step is preset as T, and S is defined as a proportion of the current moment t in the whole-step time T. At a moment of S=1, it is determined that the current moment has reached a preset whole-step time, the robot is switched from the single-foot supporting state to the support foot exchange state, and the time t is reset to time the next single-foot supporting state of the robot.

In another instance, whether the robot is in the single-foot supporting state may be determined with force induction of the feet of the robot. For instance, pressure sensors are arranged on the feet of the robot, a non-forced foot at the current moment is used as the swing foot, and in response to determining that a pressure inducted by the original swing foot exceeds a pressure threshold, it is determined that the robot is switched from the single-foot supporting state to the support foot exchange state.

It can be understood that for the above supporting state switching methods, any one of the methods may be used alone, or a specific state of the robot at the current moment may be determined under a case that any one of the above conditions is met, which is not limited in the disclosure.

The state parameter of the robot includes an angular momentum of a centroid of the robot relative to the support foot and a position of the centroid relative to the support foot. In order to reduce a computational complexity, the biped robot may be simplified as a linear inverted pendulum (ALIP) model with an angular momentum relative to the support foot. Mass of the robot is concentrated on the centroid, since the ALIP model can decouple and analyze a forward and backward motion and a left and right motion of the robot, the following process of the disclosure takes an X-Z plane as an instance to analyze a walking planning method of the robot in an uphill process.

Figure 3:
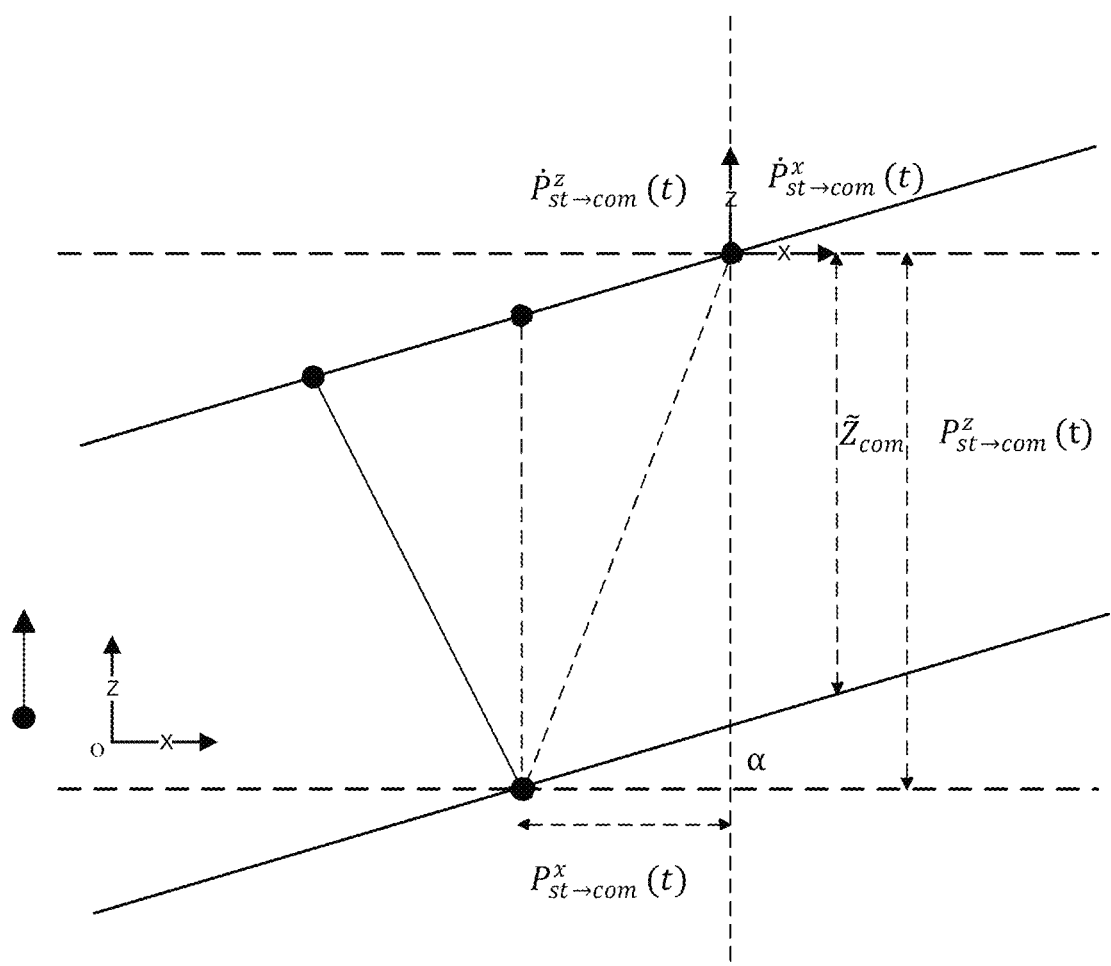
FIG. 3 is a schematic diagram of a biped robot in a single-foot supporting state illustrated according to an example of the disclosure.

FIG. 3 illustrates a schematic diagram of a biped robot in a single-foot supporting state illustrated according to an example of the disclosure.

where, m represents mass of the centroid of the robot, in order to facilitate calculation, the mass of the centroid may be assumed as unit mass;

$P_{st \to com}^{z}(t)$ represents a vertical distance of the centroid of the robot relative to the support foot at the current moment t;

$P_{st \to com}^{x}(t)$ represents a horizontal distance of the centroid of the robot relative to the support foot at the current moment t;

$\dot{P}_{st \to com}^{z}(t)$ represents a vertical speed of the centroid of the robot relative to the support foot at the current moment t;

$\dot{P}_{st \to com}^{x}(t)$ represents a current horizontal speed of the centroid of the robot relative to the support foot;

$\tilde{Z}_{com}$ represents a height difference of the robot relative to a slope; and α represents a current included angle between the slope and the ground in the X-Z plane.

Since a virtual constraint of the plane ALIP model is that a height difference of the centroid relative to the plane is unchanged, for the slope walking process shown in the disclosure, the virtual constraint may be changed to that a motion trajectory of the centroid is parallel to the slope, that is, $\tilde{Z}_{com}$ remains unchanged.

First, under the state of the current moment t, an angular momentum of the centroid relative to the support foot may be determined through a formula (1):

$$L_y(t) = P_{st \to com}^{z}(t) * \dot{P}_{st \to com}^{x}(t) - P_{st \to com}^{x}(t) * \dot{P}_{st \to com}^{z}(t) = \quad (1)$$
$$P_{st \to com}^{z}(t) * \dot{P}_{st \to com}^{x}(t) - P_{st \to com}^{x}(t) * \dot{P}_{st \to com}^{x}(t) * \tan \alpha = \tilde{Z}_{com} * \dot{P}_{st \to com}^{x}(t)$$

where, L y (t) represents an angular momentum of the centroid relative to the support foot at the current moment t, and in the formula (1), in order to facilitate simplification, the unit mass m is not shown.

According to the formula (1), the angular momentum of the centroid relative to the support foot at the current moment t can be determined with the horizontal speed of the centroid of the robot relative to the support foot at the current moment t, and a real-time speed value may be acquired through a robot motion processor. Since the height difference $\tilde{Z}_{com}$ of the robot relative to the slope is a fixed value, the angular momentum of the centroid relative to the support foot at the current moment t can be determined in real time.

Then, based on a forward motion operation, the position $P_{st \to com}^{z}(t)$ or $P_{st \to com}^{x}(t)$ of the centroid relative to the support foot at the current moment t may be determined with a joint posture parameter of the robot at the current moment t.

In step S102, based on a first preset function and a preset angular momentum value, the position of the centroid of the robot relative to a swing foot at an end moment of the current single-foot supporting state is determined according to the state parameter of the robot at the current moment, such that an angular momentum of the centroid relative to the support foot at an end moment of a next single-foot supporting state reaches the angular momentum value.

A basic control solution of the described solution of the disclosure is to determine a current landing point of the swing foot of the robot based on the state parameter at the current moment, such that the angular momentum of the centroid relative to the support foot at the end moment of the next single-foot supporting state can reach the preset angular momentum value, and the robot can stably walk on the slope. For this reason, it needs to determine a correlation function in advance, namely the first preset function, for electing the landing point of the swing foot based on a angular momentum parameter of the robot at the current moment and the preset angular momentum value.

In an optional example, the first preset function may be determined based on the following 3 system models:

1. a first successive system model configured to represent a relationship between the state parameter of the robot at the current moment and a state parameter of the robot at the end moment of the current single-foot supporting state;

first, since in the ALIP model, at a moment of single-foot support, an acceleration of the centroid relative to the support foot is merely a gravitational acceleration, an angular momentum change rate of the centroid relative to the support foot may be determined through a formula (2):

$$\dot{L}_y(t) = g \ast \dot{P}_{st \to com}^{x}(t) \tag{2}$$

where, g represents the gravitational acceleration in a current environment.

Then, obtain a single-step linear system formula (3) according to the formula (1) and the formula (2):

$$\begin{bmatrix} \dot{P}_{st \to com}^{x}(t) \\ \dot{L}_y(t) \end{bmatrix} = \begin{bmatrix} 0 & \frac{1}{\tilde{Z}_{com}} \\ g & 0 \end{bmatrix} \begin{bmatrix} P_{st \to com}^{x}(t) \\ L_y(t) \end{bmatrix} \tag{3}$$

Based on the formula (3) and the state parameter of the robot at the current moment, the state parameter at any moment of the current single-foot supporting state may be obtained. For instance, based on the state parameter of the robot at the current moment t, a state equation of the end moment $T_{K-}$ of the current single-foot supporting state may be represented by a formula (4):

$$\begin{bmatrix} P_{st \to com}^{x}(T_{K-}) \\ L_y(T_{K-}) \end{bmatrix} = \tag{4}$$

$$\begin{bmatrix} \cosh(\lambda(T_{K-}-t)) & \dfrac{\sinh(\lambda(T_{K-}-t))}{\tilde{Z}_{com} \ast \lambda} \\ \tilde{Z}_{com} \ast \lambda \ast \sinh(\lambda(T_{K-}-t)) & \cosh(\lambda(T_{K-}-t)) \end{bmatrix} \begin{bmatrix} P_{st \to com}^{x}(t) \\ L_y(t) \end{bmatrix}$$

The formula (4) is the first successive system model configured to represent the relationship between the state parameter of the robot at the current moment and the state parameter of the robot at the end moment of the current single-foot supporting state, where $P_{st \to com}^{x}(T_{K-})$ represents the horizontal distance of the centroid of the robot relative to the support foot at the end moment of the current single-foot supporting state, and $L_y(T_{K-})$ represents the angular momentum of the centroid of the robot relative to the support foot at the end moment of the current single-foot supporting state, $\lambda = \sqrt{g/\tilde{Z}_{com}}$.

Further, based on the formula (4), at the end moment $T_{K-}$ of the current single-foot supporting state, the angular momentum of the centroid of the robot relative to the support foot and the horizontal distance of the centroid relative to the support foot may be represented by a formula (5) and a formula (6) respectively:

$$L_y(T_{K-}) = \tilde{Z}_{com} \ast \lambda \ast \sinh(\lambda(T_{K-}-t)) \ast P_{st \to com}^{x}(t) + \cosh(\lambda(T_{K-}-t)) \ast L_y(t) \tag{5}$$

$$P_{st \to com}^{x}(T_{K-}) = \cosh(\lambda(T_{K-}-t)) \ast P_{st \to com}^{x}(t) + \tilde{Z}_{com} \ast \lambda \ast \sinh(\lambda(T_{K-}-t)) \ast L_y(t) \tag{6}$$

Figure 4:
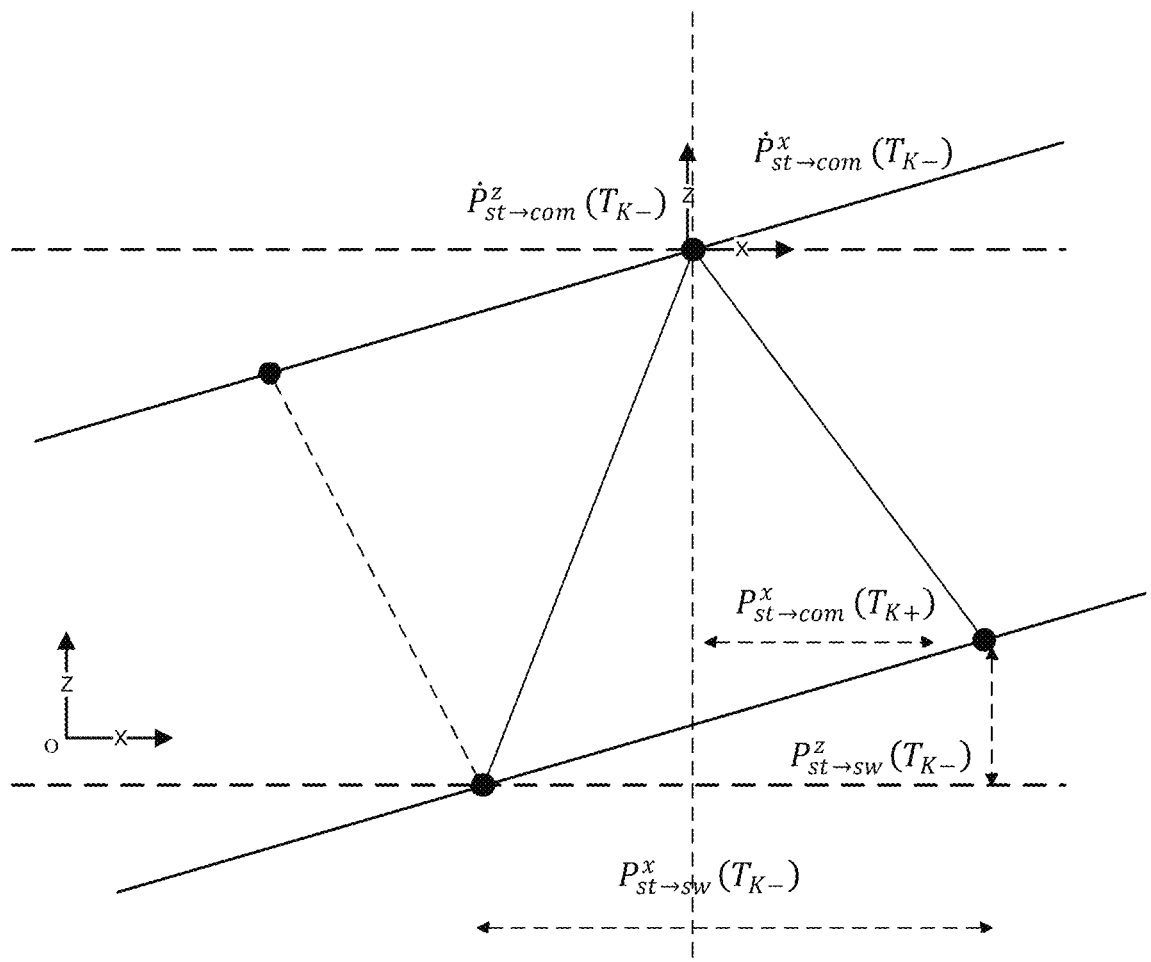
FIG. 4 is a schematic diagram of a biped robot in a support foot exchange state illustrated according to an example of the disclosure.

2. a discrete system model configured to represent a relationship between the state parameter of the robot at the end moment of the current single-foot supporting state and a state parameter of the robot at a start moment of the next single-foot supporting state;

FIG. 4 illustrates a schematic diagram of a biped robot in a support foot exchange state illustrated according to an example of the disclosure;

where, $P_{st \to com}^{x}(T_{K+})$ represents a horizontal distance of the centroid of the robot relative to the support foot at a start moment of a next single-foot supporting state;

$P_{st \to sw}^{x}(T_{K-})$ represents a horizontal distance between the support foot and the swing foot at the end moment of the current single-foot supporting state;

$P_{st \to sw}^{z}(T_{K-})$ represents a height difference between the support foot and the swing foot at the end moment of the current single-foot supporting state;

$\dot{P}_{st \to com}^{z}(T_{K-})$ represents a vertical speed of the centroid of the robot relative to the support foot at the end moment of the current single-foot supporting state; and $\dot{P}_{st \to com}^{x}(T_{K-})$ represents a horizontal speed of the centroid of the robot relative to the support foot at the end moment of the current single-foot supporting state.

The state parameter at the start moment of the next single-foot supporting state may be input to the discrete system model to obtain a formula (7) representing the angular momentum of the centroid of the robot relative to the support foot at the end moment of the next single-foot supporting state:

$$L_y(T_{K+}) = L_y(T_{K-}) + P_{st \to sw}^{x}(T_{K-}) \ast \dot{P}_{st \to com}^{z}(T_{K-}) - P_{st \to sw}^{z}(T_{K-}) \ast \dot{P}_{st \to com}^{z}(T_{K-}) \tag{7}$$

where, $L_y(T_{K+})$ represents the angular momentum of the centroid relative to the support foot at the start moment of the next single-foot supporting state, $P_{st \to sw}^{x}(T_{K-})$ and $P_{st \to sw}^{z}(T_{K-})$ can be used for representing position coordinates of a landing point of the swing foot of the robot at an end moment of the current single-foot supporting state, which are unknown at the current step.

In order to facilitate understanding, the end moment of the current single-foot supporting state may be used as a pre-collision moment of the current swing foot of the robot and the slope, and the start moment of the next single-foot supporting state is used as a post-collision moment of the current swing foot of the robot and the slope.

After the current swing foot of the robot collides with the slope, the swing foot is switched to be the support foot of the next single-foot support stage, so the horizontal distance $P_{st \to com}^{x}(T_{K+})$ of the centroid of the robot relative to the support foot at the start moment of the next single-foot supporting state is equal to the horizontal distance $P_{sw \to com}^{x}(T_{K-})$ of the centroid of the robot relative to the swing foot at the end moment of the current single-foot supporting state, that is, $$P_{st \to com}^{x}(T_{K+}) = P_{sw \to com}^{x}(T_{K-}) \quad (8)$$

The formula (7) and the formula (8) are the discrete system model configured to represent the relationship between the state parameter of the robot at the end moment of the current single-foot supporting state and the state parameter of the robot at the start moment of the next single-foot supporting state.

Figure 5:
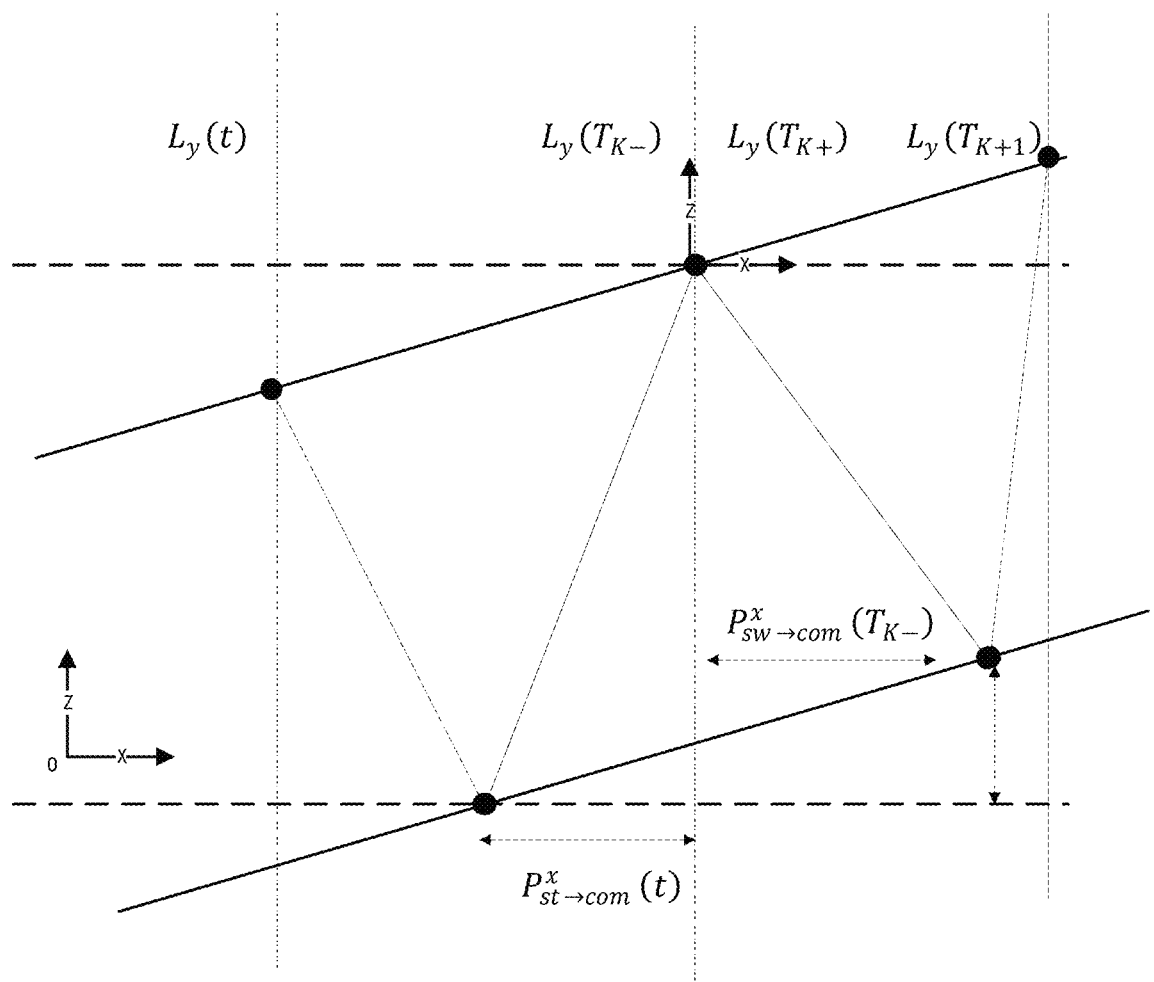
FIG. 5 is a schematic diagram of a biped robot at an end moment of a next single-foot supporting state illustrated according to an example of the disclosure.

3. a second successive system model configured to represent a relationship between the state parameter of the robot at the start moment of the next single-foot supporting state and a state parameter of the robot at the end moment of the next single-foot supporting state;

FIG. 5 illustrates a schematic diagram of a biped robot at an end moment of a next single-foot supporting state illustrated according to an example of the disclosure.

where, $L_y(T_{K+1})$ represents the angular momentum of the centroid of the robot relative to the support foot at the end moment of the next single-foot supporting state.

Similar to the first successive system model in '1', the state parameter of the robot at the start moment of the next single-foot supporting state may be input to the linear system equation again to obtain the state parameter of the robot at the end moment of the next single-foot supporting state:

$$L_y(T_{K+1}) = \tilde{Z}_{com} * \lambda * \sinh(\lambda T) * P_{st \to com}^{x}(T_{K+}) + \cosh(\lambda T) * L_y(T_{K+}) \quad (9)$$

A formula (9) is the second successive system model configured to represent the relationship between the state parameter of the robot at the start moment of the next single-foot supporting state and the state parameter of the robot at the end moment of the next single-foot supporting state.

After obtaining the above system model, the formulas (4), (7), (8) and (9) are combined and simplified, a predicting process of the angular momentum of the centroid of the robot relative to the support foot at the end moment of the next single-foot supporting state may be described as:

$$L_y(T_{K+1}) = f(L_y(t), P_{st \to com}^{x}(t), P_{sw \to com}^{x}(T_{K-})) \quad (10)$$

where, $L_y(T_{K+})$ represents the angular momentum of the centroid of the robot relative to the support foot at the start moment of the next single-foot supporting state.

Based on a formula (10), $L_y(T_{K+1})$ is set as a given preset angular momentum $L_y^{des}(T_{K+1})$, a horizontal distance formula (11) of the centroid of the robot relative to the swing foot at the end moment of the current single-foot supporting state may be obtained, where the preset angular momentum may be based on:

$$P_{sw \to com}^{x}(T_{K-}) = g(L_y(t), P_{st \to com}^{x}(t), L_y^{des}(T_{K+1})) \quad (11)$$

The formula (11) is the first preset function, based on the formula (11) and the preset angular momentum value $L_y^{des}(T_{K+1})$, the horizontal distance $P_{sw \to com}^{x}(T_{K-})$ of the centroid of the robot relative to the swing foot at the end moment of the current single-foot supporting state is determined according to the state parameter $L_y(t)$, $P_{st \to com}^{x}(t)$ of the robot at the current moment t, such that the angular momentum of the centroid relative to the support foot at the end moment of the next single-foot supporting state reaches the angular momentum value $L_y^{des}(T_{K+1})$, where the angular momentum value may be determined according to an expected speed of the centroid at the end moment of the next single-foot supporting state.

For a discrete dynamics model formula (7), the height difference $P_{st \to sw}^{z}(T_{K-})$ between the support foot and the swing foot at the end moment of the current single-foot supporting state is currently in an unknown state. The height difference can merely be determined by obtaining the coordinates of the landing point of the swing foot, and this contradiction may be solved by the method shown in FIG. 6.

Figure 6:
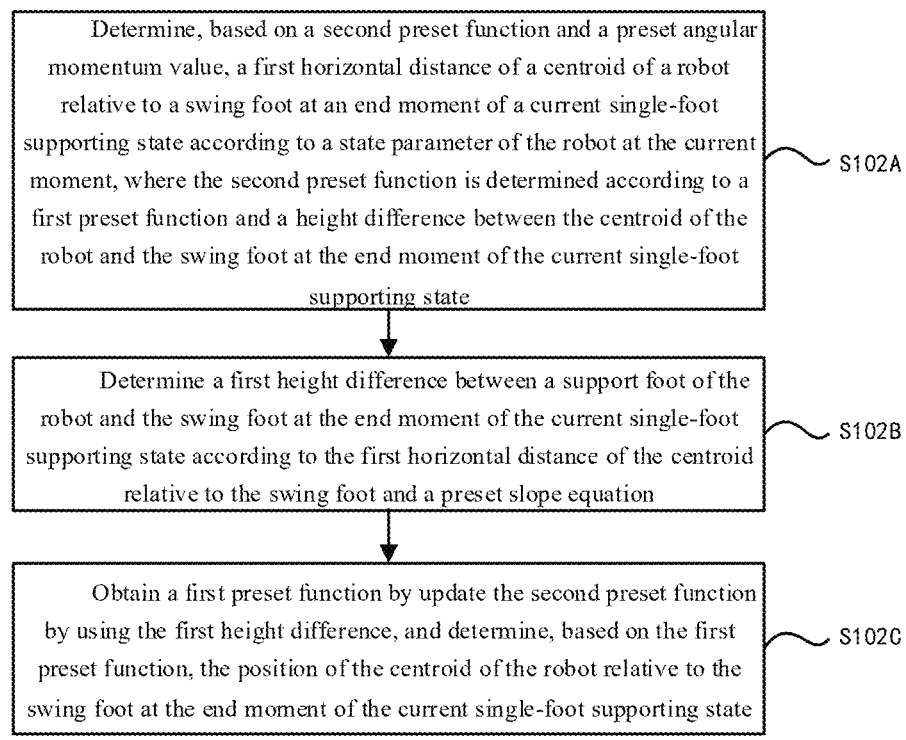
FIG. 6 is another flow chart of a motion control method illustrated according to an example of the disclosure.

As shown in FIG. 6, in step S102A, based on a second preset function and the preset angular momentum value, a first horizontal distance of the centroid of the robot relative to the swing foot at the end moment of the current single-foot supporting state is determined according to the state parameter of the robot at the current moment, where the second preset function is determined according to the first preset function and a height difference between the centroid of the robot and the swing foot at the end moment of the current single-foot supporting state.

For instance, a formula (12) may be obtained by setting the height difference between the centroid of the robot and the swing foot at the end moment of the current single-foot supporting state in the discrete system model to 0, the second preset function (13) may be obtained according to the formula (12):

$$L_y(T_{K+}) = L_y(T_{K-}) + P_{st \to sw}^{x}(T_{K-}) * \dot{P}_{st \to com}^{z}(T_{K-}) \quad (12)$$

$$P_{sw \to com}^{x}(T_{K-})(1) = g'(L_y(t), P_{st \to com}^{x}(t), L_y^{des}(T_{K+1})) \quad (13)$$

Based on the second preset function and the preset angular momentum value, the first horizontal distance $P_{sw \to com}^{x}(T_{K-})$ of the centroid of the robot relative to the swing foot at the end moment of the current single-foot supporting state is determined according to the state parameter of the robot at the current moment.

In step S102B, a first height difference between the support foot of the robot and the swing foot at the end moment of the current single-foot supporting state is determined according to the first horizontal distance of the centroid relative to the swing foot and a preset slope equation.

The preset slope equation may be set in advance and used for presenting a formula of coordinates of any point in the current slope:

$$z = a + bx + cy \quad (14a)$$

For the instance of the X-Z plane shown in the disclosure, during analyzing a walking and planning method of the robot in the uphill process, the slope equation may be simplified as:

$$z = a + bx \quad (14b)$$

The first horizontal distance $P_{sw \to com}^{x}(T_{K\_})$ (1) of the centroid relative to the swing foot may be input to the slope equation to obtain the first height difference $P_{st \to sw}^{z}(T_{K\_})(1)$ between the support foot and the swing foot at the end moment of the current single-foot supporting state.

In step S102C, the second preset function is updated by using the first height difference to obtain a first preset function, and based on the first preset function, the position of the centroid of the robot relative to the swing foot at the end moment of the current single-foot supporting state is determined.

In this step, the first height difference $P_{st \to sw}^{z}(T_{K\_})(1)$ is added to the second preset function again, so that the height difference $P_{st \to sw}^{z}(T_{K\_})$ between the support foot and the swing foot at the end moment of the current single-foot supporting state may be in a known state, and a more accurate horizontal distance $P_{sw \to com}^{x}(T_{K\_})$ of the centroid of the robot relative to the swing foot at the end moment of the current single-foot supporting state is obtained.

Then, $P_{sw \to com}^{x}(T_{K\_})$ is input to the slope equation again, so that a more accurate height difference $P_{st \to sw}^{z}(T_{K\_})$ between the support foot of the robot and the swing foot at the end moment of the current single-foot supporting state may be obtained.

Further, according to the horizontal distance $P_{st \to com}^{x}(T_{K\_})$ of the centroid relative to the support foot, the horizontal distance $P_{sw \to com}^{x}(T_{K\_})$ of the centroid relative to the swing foot and the height difference $P_{st \to sw}^{z}(T_{K\_})$ between the support foot and the swing foot at the end moment of the current single-foot supporting state, a specific gradient α of the current slope and the slope equation may be updated.

It can be understood that in most application scenarios, a ground equation is related to a direction of the landing point in an x-axis and a y-axis, which is not conducive to decoupling calculation. Since the ALIP model can decouple and analyze the front and rear motion and the left and right motion, a complex coupling calculation process caused by merely solving the slope equation and the preset functions may be avoided through the above methods.

In step S103, the robot is controlled to walk according to the position of the centroid of the robot relative to the swing foot at the end moment of the current single-foot supporting state.

Based on the above step, the position of the centroid of the robot relative to the swing foot at the end moment of the current single-foot supporting state may be obtained according to the state parameter of the robot at the current moment, so as to predict motion trajectories of the feet of the robot in a full process of the current single-foot supporting state and control the robot to walk.

In the solution of the disclosure, based on the first preset function and the preset angular momentum value, the position of the centroid of the robot relative to the swing foot at the end moment of the current single-foot supporting state is determined according to the state parameter of the robot at the current moment, so as to control the robot to walk, such that the angular momentum of the centroid of the robot relative to the support foot at the end moment of each single-foot supporting state can be adjusted to the preset angular momentum value, so that the position of the centroid of the robot is controlled in real time in a motion process, so as to adjust the motion posture of the robot. In addition, since the first preset function can be adjusted in real time according to the height difference obtained by the robot in the previous step, so that the robot can update the landing point of the robot according to the current actual terrain, such as the gradient change of the slope. Thus, the robot can still realize omni-directional stable walking in complex terrain such as the slope with the variable slope, and the motion stability of the robot is improved.

Figure 7:
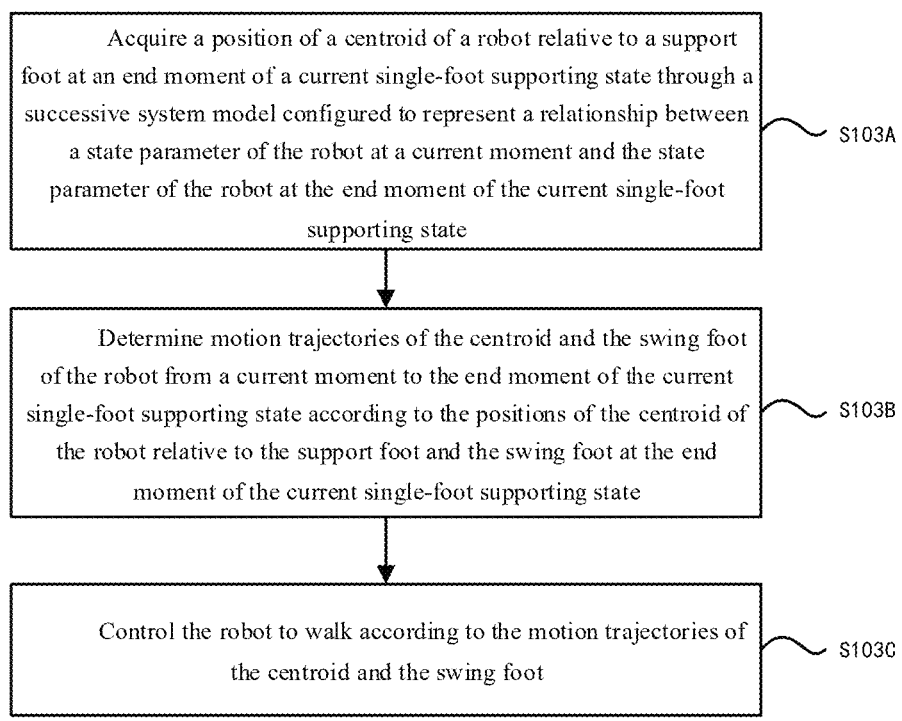
FIG. 7 is yet another flow chart of a motion control method illustrated according to an example of the disclosure.

In an optional example, a method for controlling the robot to walk according to the position of the centroid of the robot relative to the swing foot at the end moment of the current single-foot supporting state is as shown in FIG. 7, specifically including S103A to S103C.

In step S103A, the position of the centroid of the robot relative to the support foot at the end moment of the current single-foot supporting state is acquired with the successive system model configured to represent the relationship between the state parameter of the robot at the current moment and the state parameter of the robot at the end moment of the current single-foot supporting state.

It can be seen from the formula (6), the horizontal distance $P_{st \to com}^{x}(T_{K\_})$ of the centroid of the robot relative to the support foot at the end moment of the current single-foot supporting state may be determined according to the current state parameter of the robot.

In step S103B, motion trajectories of the centroid and the swing foot of the robot from the current moment to the end moment of the current single-foot supporting state are determined according to the positions of the centroid of the robot relative to the support foot and the swing foot at the end moment of the current single-foot supporting state.

Figure 8:
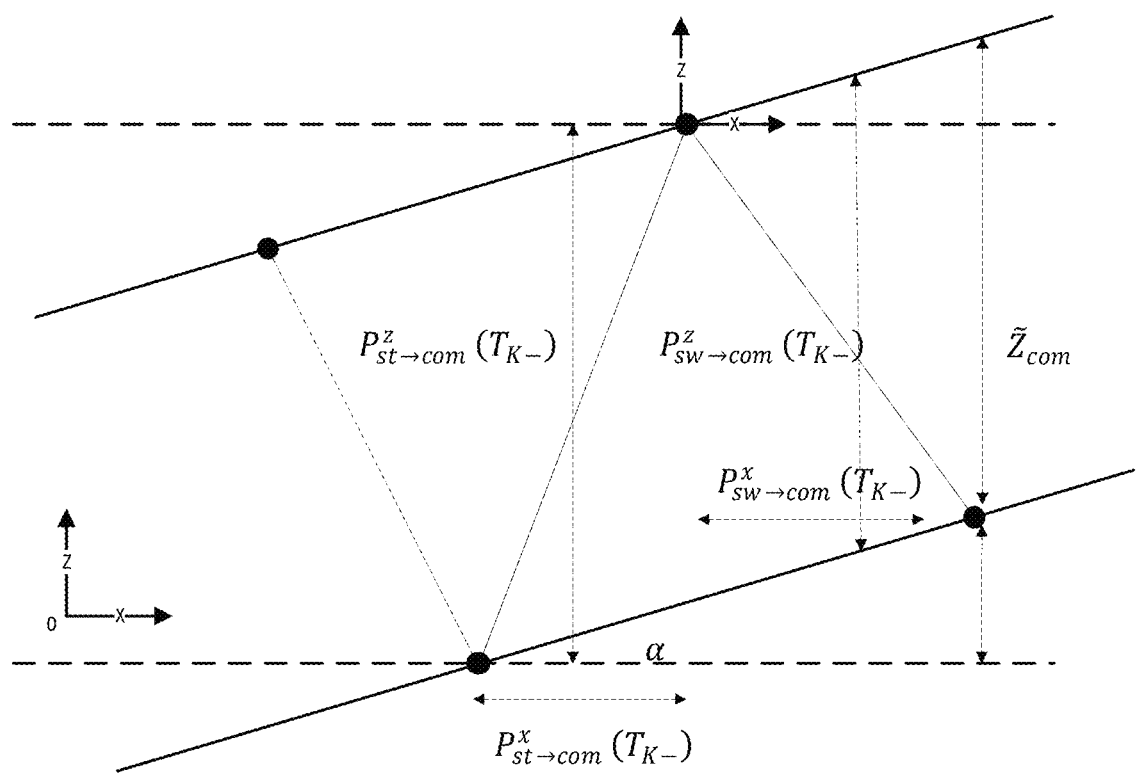
FIG. 8 is another schematic diagram of a biped robot in a support foot exchange state illustrated according to an example of the disclosure.

First, as shown in FIG. 8, according to the horizontal distance $P_{st \to com}^{x}(T_{K\_})$ of the centroid relative to the support foot and the horizontal distance $P_{sw \to com}^{x}(T_{K\_})$ of the centroid relative to the swing foot at the end moment of the current single-foot supporting state and the specific gradient α of the current slope, the height difference $P_{st \to com}^{z}(T_{K\_})$ of the centroid relative to the support foot and the height difference $P_{sw \to com}^{z}(T_{K\_})$ of the centroid relative to the swing foot may be determined through a formula (15) and a formula (16):

$$P_{st \to com}^{z}(T_{K\_}) = P_{st \to com}^{x}(T_{K\_}) * \tan \alpha + \tilde{Z}_{com} \qquad (15)$$

$$P_{sw \to com}^{z}(T_{K\_}) = P_{sw \to com}^{x}(T_{K\_}) * \tan \alpha + \dot{Z}_{com} \qquad (16)$$

Then, with trajectory interpolation, such as polynomial interpolation, the height difference of the centroid relative to the support foot and the height difference of the centroid relative to the swing foot at the current moment is taken as an initial value, and the height difference of the centroid relative to the support foot and the height difference of the centroid relative to the swing foot at the end moment of the current single-foot supporting state is taken as an end value, height change curves of the centroid of the robot and the swing foot, as well as the centroid of the robot and the support foot from the current moment to the end moment of the current single-foot supporting state, and horizontal distance change curves of the centroid of the robot and the swing foot, as well as the centroid of the robot and the support foot from the current moment to the end moment of the current single-foot supporting state may be acquired.

In step S103C, the robot is controlled to walk according to the motion trajectories of the centroid and the swing foot.

In an instance, the motion trajectories of the centroid and the swing foot may be input to a robot stability controller, such that the robot realizes stable walking on the slope according to a predicted lateral trajectory result.

In the solution of the disclosure, the motion trajectories of the centroid and the swing foot of the robot from the current moment to the end moment of the current single-foot supporting state are determined according to the positions of the centroid of the robot relative to the support foot and the swing foot at the end moment of the current single-foot supporting state, such that the angular momentum of the centroid of the robot relative to the support foot at each single-foot support end moment can be adjusted to the preset angular momentum value, so that the position of the centroid of the robot is controlled in real time in the motion process, and the motion posture of the robot is adjusted accordingly, so that the robot can still realize omni-directional stable walking even in the slope and other complex terrain, and the motion stability of the robot is improved. For the sake of simple description, the above method examples are all expressed as a series of action combinations, but those of ordinary skill in the art should understand that the disclosure is not limited by the described action sequences, because according to the disclosure, certain steps may be performed in other sequences or at the same time.

Secondly, those of ordinary skill in the art also should understand that the examples described in the specifications all belong to optional examples, and involved actions and modules are not certainly necessary for the disclosure.

Corresponding to the above examples of the application function implementation method, the disclosure further provides examples of an application function implementation apparatus and a corresponding terminal.

Figure 9:
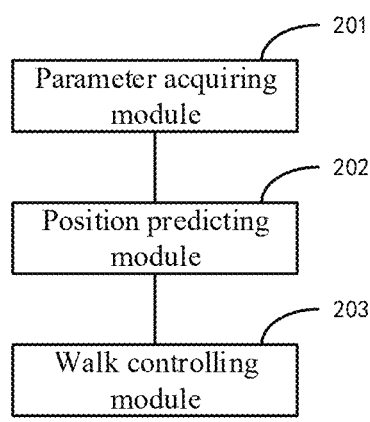
FIG. 9 is a schematic diagram of a motion control apparatus illustrated according to an example of the disclosure.

A motion control apparatus illustrated by an example of the disclosure, as shown in FIG. 9, is applied to a biped robot, and the apparatus includes:

- a parameter acquiring module 201, configured to acquire a state parameter of the robot at the current moment in response to determining that the robot is in a single-foot supporting state, where the state parameter includes an angular momentum of a centroid of the robot relative to a support foot and a position of the centroid relative to the support foot;
- a position predicting module 202, configured to determine, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and
- a walk controlling module 203, configured to control the robot to walk according to the position of the centroid of the robot relative to the swing foot at the end moment of the current single-foot supporting state.

In conjunction with any implementation of the disclosure, the first preset function is determined according to the following system models:

- a first successive system model configured to represent a relationship between the state parameter of the robot at the current moment and a state parameter of the robot at the end moment of the current single-foot supporting state;
- a discrete system model configured to represent a relationship between the state parameter of the robot at the end moment of the current single-foot supporting state and a state parameter of the robot at a start moment of the next single-foot supporting state; and
- a second successive system model configured to represent a relationship between the state parameter of the robot at the start moment of the next single-foot supporting state and a state parameter of the robot at the end moment of the next single-foot supporting state.

In conjunction with any implementation of the disclosure, when determining, based on the first preset function and the preset angular momentum value, the position of the centroid of the robot relative to the swing foot at the end moment of the current single-foot supporting state according to the state parameter of the robot at the current moment, the position predicting module is specifically configured to:

- determine, based on a second preset function and the preset angular momentum value, a first horizontal distance of the centroid of the robot relative to the swing foot at the end moment of the current single-foot supporting state according to the state parameter of the robot at the current moment, where the second preset function is determined according to the first preset function and a height difference between the centroid of the robot and the swing foot at the end moment of the current single-foot supporting state;
- determine a first height difference between the support foot of the robot and the swing foot at the end moment of the current single-foot supporting state according to the first horizontal distance of the centroid relative to the swing foot and a preset slope equation; and
- obtain the first preset function by updating the second preset function by using the first height difference, and determine, based on the first preset function, the position of the centroid of the robot relative to the swing foot at the end moment of the current single-foot supporting state.

In conjunction with any implementation of the disclosure, when controlling the robot to walk according to the position of the centroid of the robot relative to the swing foot at the end moment of the current single-foot supporting state, the walk controlling module is specifically configured to:

- acquire the position of the centroid of the robot relative to the support foot at the end moment of the current single-foot supporting state with the successive system model configured to represent the relationship between the current state parameter of the robot and the state parameter of the robot at the end moment of the current single-foot supporting state;
- determine motion trajectories of the centroid and the swing foot of the robot from the current moment to the end moment of the current single-foot supporting state according to the positions of the centroid of the robot relative to the support foot and the swing foot at the end moment of the current single-foot supporting state; and
- control the robot to walk according to the motion trajectories of the centroid and the swing foot.

In conjunction with any implementation of the disclosure, when determining the motion trajectories of the centroid and the swing foot of the robot from the current moment to the end moment of the current single-foot supporting state according to the positions of the centroid of the robot relative to the support foot and the swing foot at the end moment of the current single-foot supporting state, the walk controlling module is specifically configured to:

- determine, according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and determine, according to horizontal distances of the centroid of the robot relative to the support foot and the swing foo at the current moment t, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

In conjunction with any implementation of the disclosure, the angular momentum of the centroid of the robot relative to the support foot is determined according to a horizontal speed of the centroid.

In conjunction with any implementation of the disclosure, the position of the centroid relative to the support foot is determined according to a joint posture parameter of the robot.

As for the apparatus examples, since it basically corresponds to the method examples, please refer to the partial description of the method examples for the relevant parts. The above apparatus examples are merely schematic, the above units described as separate components may or may not be physically separated, and the components displayed as units may or may not be physical units, that is, they may be located in one place, or may be distributed to a plurality of network units. Some or all of the modules may be selected according to actual needs to realize the purpose of the solution of the disclosure. Those of ordinary skill in the art may understand and implement it without creative labor.

Figure 10:
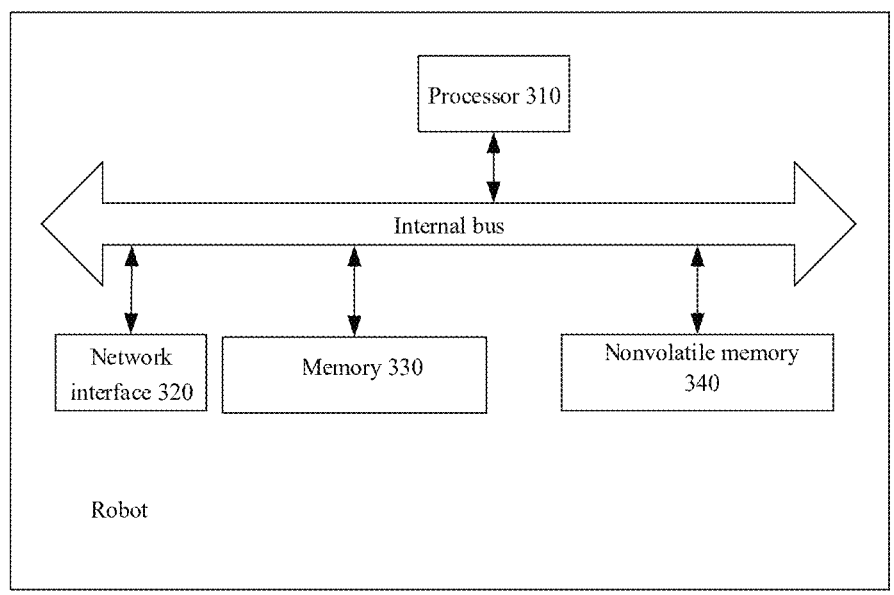
FIG. 10 is a block diagram of a robot illustrated according to an example of the disclosure.

The examples of the motion control apparatus in the specification may be applied to robots. The apparatus examples may be implemented by software, hardware or a combination of the hardware and the software. Taking software implementation as an instance, as an apparatus in a logical sense, it is formed by reading corresponding computer program instructions in a nonvolatile memory to a memory by a processor controlled by its motion. From the hardware level, as shown in FIG. 10, which is a hardware structural diagram of a robot where the motion control apparatus is located in the example of the specification, in addition to a processor 310, a memory 330, a network interface 320 and a nonvolatile memory 340 shown in FIG. 10, a server or an electronic device where the apparatus is located in the example may usually further include other hardware according to an actual function of a computer device, which will not be repeated here.

Other implementations of the disclosure will be apparent to those skilled in the art from consideration of the specification and practice of the disclosure here. The present application is intended to cover any variations, uses, or adaptations of the disclosure, and these variations, uses or adaptations follow general principles of the disclosure and include the common knowledge or customary practice in the art not disclosed in the disclosure. The specification and examples are considered as instances merely, and the true scope and spirit of the disclosure are indicated by the following claims.

It should be understood that the disclosure is not limited to the exact structure that has been described above and illustrated in the accompanying drawings, and various modifications and changes may be made without departing from its scope. The scope of the disclosure is merely limited by the appended claims.

According to a first aspect of an example of the disclosure, a motion control method is provided and performed by a biped robot, and the method includes:
  acquiring a state parameter of the robot at a current moment in response to determining that the robot is in a single-foot supporting state, where the state parameter includes an angular momentum of a centroid of the robot relative to a support foot and a position of the centroid relative to the support foot;
  determining, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and
  controlling the robot to walk according to the position of the centroid of the robot relative to the swing foot at the end moment of the current single-foot supporting state.

In conjunction with any implementation of the disclosure, the first preset function is determined according to the following system models:
  a first successive system model configured to represent a relationship between the state parameter of the robot at the current moment and a state parameter of the robot at the end moment of the current single-foot supporting state;
  a discrete system model configured to represent a relationship between the state parameter of the robot at the end moment of the current single-foot supporting state and a state parameter of the robot at a start moment of the next single-foot supporting state; and
  a second successive system model configured to represent a relationship between the state parameter of the robot at the start moment of the next single-foot supporting state and a state parameter of the robot at the end moment of the next single-foot supporting state.

In conjunction with any implementation of the disclosure, determining, based on the first preset function and the preset angular momentum value, the position of the centroid of the robot relative to the swing foot at the end moment of the current single-foot supporting state according to the state parameter of the robot at the current moment, includes:
  determining, based on a second preset function and the preset angular momentum value, a first horizontal distance of the centroid of the robot relative to the swing foot at the end moment of the current single-foot supporting state according to the state parameter of the robot at the current moment, where the second preset function is determined according to the first preset function and a height difference between the centroid of the robot and the swing foot at the end moment of the current single-foot supporting state;
  determining a first height difference between the support foot of the robot and the swing foot at the end moment of the current single-foot supporting state according to the first horizontal distance of the centroid relative to the swing foot and a preset slope equation; and
  obtaining the first preset function by updating the second preset function by using the first height difference, and determining, based on the first preset function, the position of the centroid of the robot relative to the swing foot at the end moment of the current single-foot supporting state.

In conjunction with any implementation of the disclosure, controlling the robot to walk according to the position of the centroid of the robot relative to the swing foot at the end moment of the current single-foot supporting state, includes:

acquiring the position of the centroid of the robot relative to the support foot at the end moment of the current single-foot supporting state with the successive system model configured to represent the relationship between the state parameter of the robot at the current moment and the state parameter of the robot at the end moment of the current single-foot supporting state;

determining motion trajectories of the centroid and the swing foot of the robot from the current moment to the end moment of the current single-foot supporting state according to the positions of the centroid of the robot relative to the support foot and the swing foot at the end moment of the current single-foot supporting state; and controlling the robot to walk according to the motion trajectories of the centroid and the swing foot.

In conjunction with any implementation of the disclosure, determining the motion trajectories of the centroid and the swing foot of the robot from the current moment to the end moment of the current single-foot supporting state according to the positions of the centroid of the robot relative to the support foot and the swing foot at the end moment of the current single-foot supporting state, includes:

determining, according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and determining, according to horizontal distances of the centroid of the robot relative to the support foot and the swing foot at the current moment, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

In conjunction with any implementation of the disclosure, the angular momentum of the centroid of the robot relative to the support foot is determined according to a horizontal speed of the centroid.

In conjunction with any implementation of the disclosure, the position of the centroid relative to the support foot is determined according to a joint posture parameter of the robot.

According to a second aspect of an example of the disclosure, a motion control apparatus is provided and applied to a biped robot, and the apparatus includes:

a parameter acquiring module, configured to acquire a state parameter of the robot at the current moment in response to determining that the robot is in a single-foot supporting state, where the state parameter includes an angular momentum of a centroid of the robot relative to a support foot and a position of the centroid relative to the support foot;

a position predicting module, configured to determine, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and a walk controlling module, configured to control the robot to walk according to the position of the centroid of the robot relative to the swing foot at the end moment of the current single-foot supporting state.

In conjunction with any implementation of the disclosure, the first preset function is determined according to the following system models:

a first successive system model configured to represent a relationship between the state parameter of the robot at the current moment and a state parameter of the robot at the end moment of the current single-foot supporting state;

a discrete system model configured to represent a relationship between the state parameter of the robot at the end moment of the current single-foot supporting state and a state parameter of the robot at a start moment of the next single-foot supporting state; and a second successive system model configured to represent a relationship between the state parameter of the robot at the start moment of the next single-foot supporting state and a state parameter of the robot at the end moment of the next single-foot supporting state.

In conjunction with any implementation of the disclosure, when determining, based on the first preset function and the preset angular momentum value, the position of the centroid of the robot relative to the swing foot at the end moment of the current single-foot supporting state according to the state parameter of the robot at the current moment, the position predicting module is specifically configured to:

determine, based on a second preset function and the preset angular momentum value, a first horizontal distance of the centroid of the robot relative to the swing foot at the end moment of the current single-foot supporting state according to the state parameter of the robot at the current moment, where the second preset function is determined according to the first preset function and a height difference between the centroid of the robot and the swing foot at the end moment of the current single-foot supporting state;

determine a first height difference between the support foot of the robot and the swing foot at the end moment of the current single-foot supporting state according to the first horizontal distance of the centroid relative to the swing foot and a preset slope equation; and obtain the first preset function by updating the second preset function by using the first height difference, and determine, based on the first preset function, the position of the centroid of the robot relative to the swing foot at the end moment of the current single-foot supporting state.

In conjunction with any implementation of the disclosure, when controlling the robot to walk according to the position of the centroid of the robot relative to the swing foot at the end moment of the current single-foot supporting state, the walk controlling module is specifically configured to:

acquire the position of the centroid of the robot relative to the support foot at the end moment of the current single-foot supporting state with the successive system model configured to represent the relationship between the state parameter of the robot at the current moment and the state parameter of the robot at the end moment of the current single-foot supporting state;

determine motion trajectories of the centroid and the swing foot of the robot from the current moment to the end moment of the current single-foot supporting state according to the positions of the centroid of the robot relative to the support foot and the swing foot at the end moment of the current single-foot supporting state; and control the robot to walk according to the motion trajectories of the centroid and the swing foot.

In conjunction with any implementation of the disclosure, when determining the motion trajectories of the centroid and the swing foot of the robot from the current moment to the end moment of the current single-foot supporting state according to the positions of the centroid of the robot relative to the support foot and the swing foot at the end moment of the current single-foot supporting state, the walk controlling module is specifically configured to:

determine, according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and determine, according to horizontal distances of the centroid of the robot relative to the support foot and the swing foot at the current moment, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

In conjunction with any implementation of the disclosure, the angular momentum of the centroid of the robot relative to the support foot is determined according to a horizontal speed of the centroid.

In conjunction with any implementation of the disclosure, the position of the centroid relative to the support foot is determined according to a joint posture parameter of the robot.

According to a third aspect of an example of the disclosure, a robot is provided, including:

a memory, configured to store processor executable instructions; and a processor, configured to execute the executable instructions stored in the memory to implement steps of the method described in any implementation of the first aspect.

According a fourth aspect of an example of the disclosure, a non-transitory computer readable storage medium is provided, storing a computer program, and the program, when executed by a processor, implements steps of the method described in any implementation of the first aspect.

A technical solution provided by the examples of the disclosure may include the following beneficial effects:

based on the first preset function and the preset angular momentum value, the position of the centroid of the robot relative to the swing foot at the end moment of the current single-foot supporting state is determined according to the state parameter of the robot at the current moment, so as to control the robot to walk, such that the angular momentum of the centroid of the robot relative to the support foot at each single-foot support end moment can be adjusted to the preset angular momentum value, so that the position of the centroid of the robot is controlled in real time in a motion process, and a motion posture of the robot is adjusted accordingly, so that the robot can still realize omni-directional stable walking even in a slope and other complex terrain, and motion stability of the robot is improved.

It needs to be understood that the above general descriptions and later detailed descriptions are merely explanatory and illustrative, and cannot limit the disclosure.

What is claimed is:

1. A motion control method, performed by a biped robot, and comprising:

acquiring a state parameter of the robot at a current moment in response to determining that the robot is in a single-foot supporting state, wherein the state parameter comprises an angular momentum of a centroid of the robot relative to a support foot and a position of the centroid relative to the support foot;

determining, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and controlling the robot to walk according to the position of the centroid of the robot relative to the swing foot at the end moment of the current single-foot supporting state.

2. The method according to claim 1, wherein the first preset function is determined according to the following system models:

a first successive system model configured to represent a relationship between the state parameter of the robot at the current moment and a state parameter of the robot at the end moment of the current single-foot supporting state;

a discrete system model configured to represent a relationship between the state parameter of the robot at the end moment of the current single-foot supporting state and a state parameter of the robot at a start moment of the next single-foot supporting state; and a second successive system model configured to represent a relationship between the state parameter of the robot at the start moment of the next single-foot supporting state and a state parameter of the robot at the end moment of the next single-foot supporting state.

3. The method according to claim 2, wherein determining, based on the first preset function and the preset angular momentum value, the position of the centroid of the robot relative to the swing foot at the end moment of the current single-foot supporting state according to the state parameter of the robot at the current moment, comprises:

determining, based on a second preset function and the preset angular momentum value, a first horizontal distance of the centroid of the robot relative to the swing foot at the end moment of the current single-foot supporting state according to the state parameter of the robot at the current moment, wherein the second preset function is determined according to the first preset function and a height difference between the centroid of the robot and the swing foot at the end moment of the current single-foot supporting state;

determining a first height difference between the support foot of the robot and the swing foot at the end moment of the current single-foot supporting state according to the first horizontal distance of the centroid relative to the swing foot and a preset slope equation; and obtaining the first preset function by updating the second preset function by using the first height difference, and determining, based on the first preset function, the position of the centroid of the robot relative to the swing foot at the end moment of the current single-foot supporting state.

4. The method according to claim 1, wherein controlling the robot to walk according to the position of the centroid of the robot relative to the swing foot at the end moment of the current single-foot supporting state, comprises:

acquiring the position of the centroid of the robot relative to the support foot at the end moment of the current single-foot supporting state with a successive system model configured to represent the relationship between the state parameter of the robot at the current moment and the state parameter of the robot at the end moment of the current single-foot supporting state;

determining motion trajectories of the centroid and the swing foot of the robot from the current moment to the end moment of the current single-foot supporting state according to the positions of the centroid of the robot relative to the support foot and the swing foot at the end moment of the current single-foot supporting state; and controlling the robot to walk according to the motion trajectories of the centroid and the swing foot.

5. The method according to claim 4, wherein determining the motion trajectories of the centroid and the swing foot of the robot from the current moment to the end moment of the current single-foot supporting state according to the positions of the centroid of the robot relative to the support foot and the swing foot at the end moment of the current single-foot supporting state, comprises:

determining, according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and determining, according to horizontal distances of the centroid of the robot relative to the support foot and the swing foot at the current moment, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

6. The method according to claim 1, wherein the angular momentum of the centroid of the robot relative to the support foot is determined according to a horizontal speed of the centroid.

7. The method according to claim 1, wherein the position of the centroid relative to the support foot is determined according to a joint posture parameter of the robot.

8. A robot, comprising:
a memory, configured to store processor executable instructions; and
a processor, configured to:
acquire a state parameter of the robot at a current moment in response to determining that the robot is in a single-foot supporting state, wherein the state parameter comprises an angular momentum of a centroid of the robot relative to a support foot and a position of the centroid relative to the support foot;
determine, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and
control the robot to walk according to the position of the centroid of the robot relative to the swing foot at the end moment of the current single-foot supporting state.

9. The robot according to claim 8, wherein the first preset function is determined according to the following system models:
a first successive system model configured to represent a relationship between the state parameter of the robot at the current moment and a state parameter of the robot at the end moment of the current single-foot supporting state;
a discrete system model configured to represent a relationship between the state parameter of the robot at the end moment of the current single-foot supporting state and a state parameter of the robot at a start moment of the next single-foot supporting state; and
a second successive system model configured to represent a relationship between the state parameter of the robot at the start moment of the next single-foot supporting state and a state parameter of the robot at the end moment of the next single-foot supporting state.

10. The robot according to claim 9, wherein the processor is further configured to:
determine, based on a second preset function and the preset angular momentum value, a first horizontal distance of the centroid of the robot relative to the swing foot at the end moment of the current single-foot supporting state according to the state parameter of the robot at the current moment, wherein the second preset function is determined according to the first preset function and a height difference between the centroid of the robot and the swing foot at the end moment of the current single-foot supporting state;
determine a first height difference between the support foot of the robot and the swing foot at the end moment of the current single-foot supporting state according to the first horizontal distance of the centroid relative to the swing foot and a preset slope equation; and
obtain the first preset function by updating the second preset function by using the first height difference, and determine, based on the first preset function, the position of the centroid of the robot relative to the swing foot at the end moment of the current single-foot supporting state.

11. The robot according to claim 8, wherein the processor is further configured to:
acquire the position of the centroid of the robot relative to the support foot at the end moment of the current single-foot supporting state with a successive system model configured to represent the relationship between the state parameter of the robot at the current moment and the state parameter of the robot at the end moment of the current single-foot supporting state;
determine motion trajectories of the centroid and the swing foot of the robot from the current moment to the end moment of the current single-foot supporting state according to the positions of the centroid of the robot relative to the support foot and the swing foot at the end moment of the current single-foot supporting state; and
control the robot to walk according to the motion trajectories of the centroid and the swing foot.

12. The robot according to claim 11, wherein the processor is further configured to:
determine according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and
determine, according to horizontal distances of the centroid of the robot relative to the support foot and the swing foot at the current moment, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

13. The robot according to claim 8, wherein the angular momentum of the centroid of the robot relative to the support foot is determined according to a horizontal speed of the centroid.

14. The robot according to claim 8, wherein the position of the centroid relative to the support foot is determined according to a joint posture parameter of the robot.

15. A non-transitory computer-readable storage medium, on which computer program are stored that, when executed by a processor, cause the processor to:
acquire a state parameter of the robot at a current moment in response to determining that the robot is in a single-foot supporting state, wherein the state parameter comprises an angular momentum of a centroid of the robot relative to a support foot and a position of the centroid relative to the support foot;
determine, based on a first preset function and a preset angular momentum value, the position of the centroid of the robot relative to a swing foot at an end moment of the current single-foot supporting state according to the state parameter of the robot at the current moment, such that an angular momentum of the centroid relative to the support foot at an end moment of a next single-foot supporting state reaches the angular momentum value; and
control the robot to walk according to the position of the centroid of the robot relative to the swing foot at the end moment of the current single-foot supporting state.

16. The non-transitory computer-readable storage medium according to claim 15, wherein the first preset function is determined according to the following system models:
A first successive system model configured to represent a relationship between the state parameter of the robot at the current moment and a state parameter of the robot at the end moment of the current single-foot supporting state;
a discrete system model configured to represent a relationship between the state parameter of the robot at the end moment of the current single-foot supporting state and a state parameter of the robot at a start moment of the next single-foot supporting state; and
a second successive system model configured to represent a relationship between the state parameter of the robot at the start moment of the next single-foot supporting state and a state parameter of the robot at the end moment of the next single-foot supporting state.

17. The non-transitory computer-readable storage medium according to claim 16, where the computer program, when executed by the processor, further cause the processor to:
determine, based on a second preset function and the preset angular momentum value, a first horizontal distance of the centroid of the robot relative to the swing foot at the end moment of the current single-foot supporting state according to the state parameter of the robot at the current moment, wherein the second preset function is determined according to the first preset function and a height difference between the centroid of the robot and the swing foot at the end moment of the current single-foot supporting state;
determine a first height difference between the support foot of the robot and the swing foot at the end moment of the current single-foot supporting state according to the first horizontal distance of the centroid relative to the swing foot and a preset slope equation; and
obtain the first preset function by updating the second preset function by using the first height difference, and determine, based on the first preset function, the position of the centroid of the robot relative to the swing foot at the end moment of the current single-foot supporting state.

18. The non-transitory computer-readable storage medium according to claim 15, where the computer program, when executed by the processor, further cause the processor to:
acquire the position of the centroid of the robot relative to the support foot at the end moment of the current single-foot supporting state with a successive system model configured to represent the relationship between the state parameter of the robot at the current moment and the state parameter of the robot at the end moment of the current single-foot supporting state;
determine motion trajectories of the centroid and the swing foot of the robot from the current moment to the end moment of the current single-foot supporting state according to the positions of the centroid of the robot relative to the support foot and the swing foot at the end moment of the current single-foot supporting state; and control the robot to walk according to the motion trajectories of the centroid and the swing foot.

19. The non-transitory computer-readable storage medium according to claim 18, where the computer program, when executed by the processor, further cause the processor to:
  determine, according to height differences of the centroid of the robot relative to the support foot and the swing foot at the current moment, and height differences of the centroid of the robot relative to the support foot and the swing foot at the end moment of the current single-foot supporting state, height change curves between the centroid of the robot and the swing foot, as well as the centroid of the robot and the support foot, from the current moment to the end moment of the current single-foot supporting state with trajectory interpolation; and
  determine, according to horizontal distances of the centroid of the robot relative to the support foot and the swing foot at the current moment, and horizontal distances of the centroid of the robot relative to the support foot and the swing foot at the end moment of the current single-foot supporting state, horizontal distance change curves between the centroid of the robot and the swing foot, as well as the centroid of the robot and the support foot, from the current moment to the end moment of the current single-foot supporting state with the trajectory interpolation.

20. The non-transitory computer-readable storage medium according to claim 15, wherein the angular momentum of the centroid of the robot relative to the support foot is determined according to a horizontal speed of the centroid.

* * * * *